United States Patent

[11] 3,573,807

[72] Inventor George T. Osborne
St. Paul, Minn.
[21] Appl. No. 846,121
[22] Filed July 30, 1969
[45] Patented Apr. 6, 1971
[73] Assignee Sperry Rand Corporation
New York, N.Y.

[54] DIGITAL ENCODER APPARATUS
3 Claims, 2 Drawing Figs.

[52] U.S. Cl. .......... 340/365, 178/17R, 235/145R, 340/166R
[51] Int. Cl. .......... G06f 3/02
[50] Field of Search .......... 340/166, 337, 365, 354; 178/17, 79; 235/145, 146

[56] References Cited
UNITED STATES PATENTS
3,284,773 11/1966 Say Kay .......... 340/147
3,317,896 5/1967 Bollesen et al. .......... 340/166
3,441,671 4/1969 Hennig .......... 178/17

*Primary Examiner*—Robert L. Richardson
*Attorneys*—Kenneth T. Grace, Thomas J. Nikolai and John P. Dority

ABSTRACT: A matrix of switches is arranged in columns and rows with separate column and row conductors coupling, in parallel, all the switches of the respectively associated column and row. A closed switch selects one column conductor and one row conductor, the opposite ends of each of which are serially coupled to a number of input windings that are associated with a like number of transformers. Each transformer is assigned a respectively associated binary value whereby the closing of a switch concurrently induces in the associated output windings output signals that are representative of the associated binary value.

INVENTOR
GEORGE T. OSBORNE
BY Kenneth S. Grace
ATTORNEY

PATENTED APR 6 1971 3,573,807

INVENTOR
GEORGE T. OSBORNE
BY Kenneth T. Grace
ATTORNEY

DIGITAL ENCODER APPARATUS

BACKGROUND OF THE INVENTION

The present invention relates to an electronic data processing system and in particular to a digital encoder for converting information representative of an operator keyboard key to an associated binary code. Such digital encoder is utilized in its preferred embodiment to replace a core rope memory system that utilizes saturable cores as the memory devices. Such core rope memory systems are well known in the art with the following articles providing an excellent background therefor: "Applications of Rope Memory Devices," Computer Design, Aug. 1964, pages 12—22; "-Core-Rope Memory," Computer Design, Jun. 1963, pages 16-—19.

Such prior art rope memories utilize saturable transformer elements such as ferrite toroidal cores as the memory elements with such cores being established in a first or a second and opposite polarization representative of the storage of a 1 or of a 0, as is well known in the art. Such saturable transformer arrangements require circuitry variously called inhibit, set, or reset filed whereby the saturable transformer elements may be set into their desired magnetic polarization representative of the stored data. See the J. A. Rajchman U.S. Pat. No. 2,734,182. The use of nonsaturable transformer elements as the memory elements eliminates many of the onerous requirements of core rope memories utilizing saturable transformer elements as the memory devices. In the use of nonsaturable transformer elements the elements do not require a predetermined state of magnetic polarization, such elements having no magnetic remanence; the stored data being representative of the threading or nonthreading of the memory element by the word line being sufficient to provide a pulse or no-pulse on a sense line coupled to the associated nonsaturable transformer element.

Such prior art core rope memories, which are in essence digital encoders, utilize a plurality of word lines, one word line for each word associated with the read-only memory and a plurality of sense lines, one sense line associated with each of the memory elements of the array. It is desirable, in operator keyboard units, where each key on the keyboard incorporates a switch for selecting one of the multibit words of the digital encoder, to reduce to a minimum the number of wires that couple the switches in the keyboard to the associated memory elements, such as the transformers utilized by the present invention. It is thus an object of the present invention to provide an improved digital encoder for an operator's keyboard unit providing a reduced number of conductors intercoupling the keyboard switches and the related transformer elements.

SUMMARY OF THE INVENTION

The present invention relates to a digital encoder in which the closing of a single switch produces, in parallel, all the bits of a multibit word. In the preferred embodiment, the switches are integral with associated keys of an operator's keyboard unit, and are electrically arranged in a matrix array of rows and columns. Separate row and column conductors couple, in parallel, all the switches of the respectively associated row and column whereby the selecting, or depressing, of a single key selects, or energizes, the one respectively associated row conductor, column conductor combination. The row and column conductors are, in turn, coupled to input windings of selected ones of a plurality of transformers, one input winding per selected transformer. Each transformer is assigned a respectively associated binary value, i.e., weighted, whereby the closing of a single switch concurrently produces at the output windings of the selected transformers a plurality of weighted binary signals that are representative of the digital value of the associated key.

BRIEF DESCRIPTION OF THE DRAWING

The single FIGURE illustrates the electrical schematic of the present invention.

DESCRIPTION OF THE PREFERRED EMBODIMENT

Figure 1A:
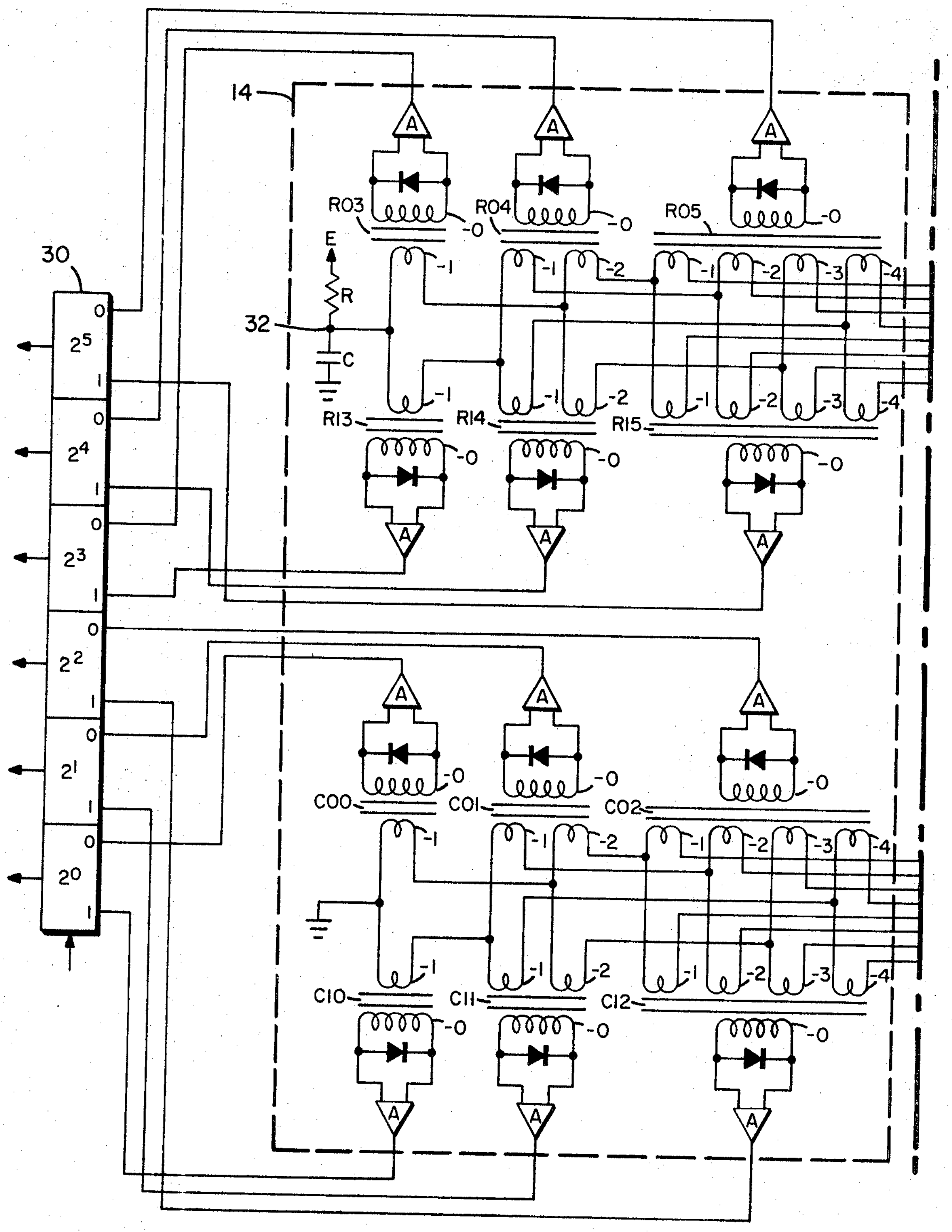
Figure 1B:
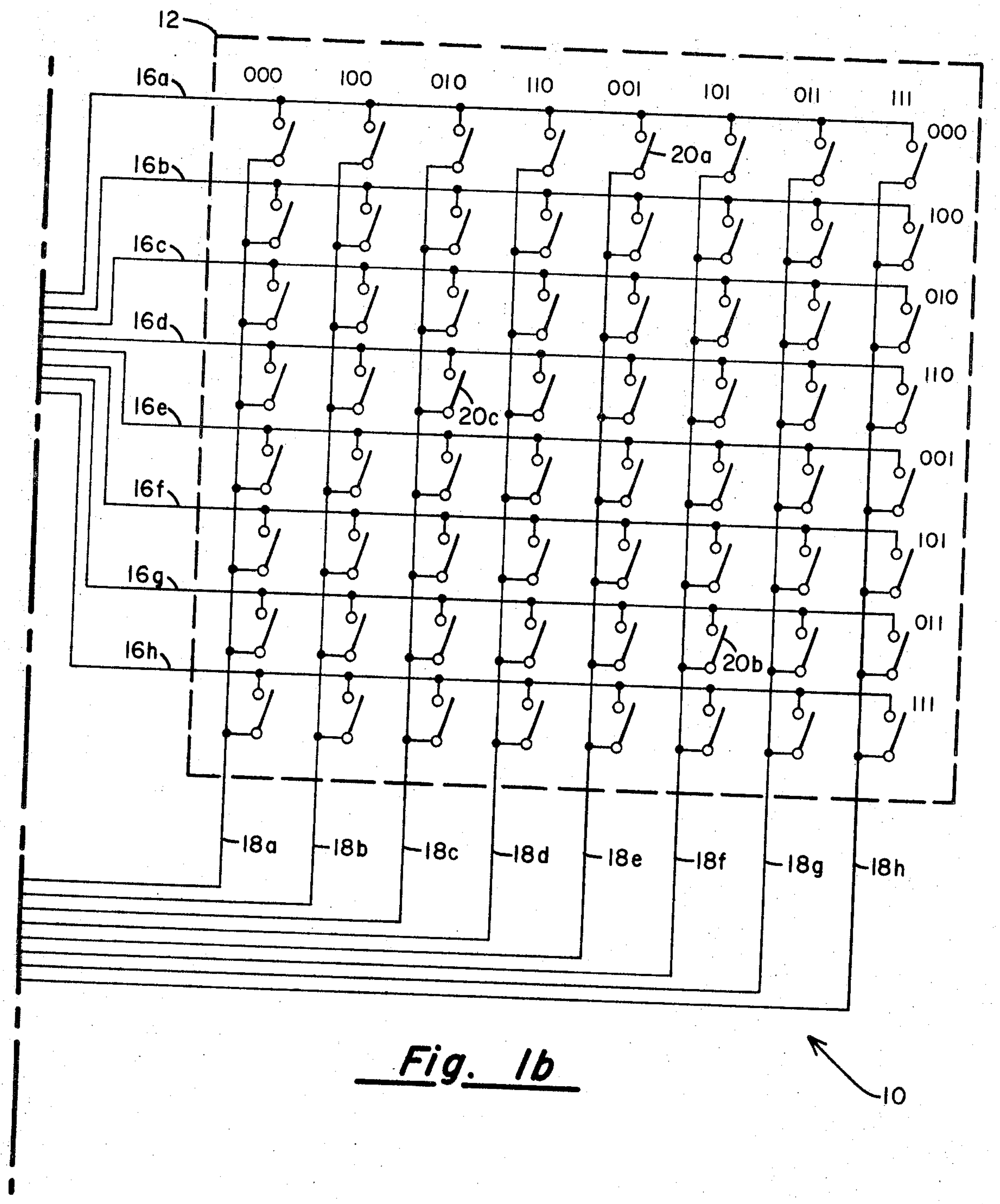

With particular reference to the single FIGURE there is presented an illustration of the electrical schematic of the encoder 10 of the present invention. Encoder 10 essentially consists of switch array 12 and transformer array 14 electrically intercoupled by row conductors 16 and column conductors 18. The arrangement is such that the closing of a single switch 20 selects, or energizes, one row conductor 16, column conductor 18 combination whereby transformer array 14 is caused to emit from the respectively selected transformer output windings weighted binary signals that are representative of the digital value of the associated key 20.

Switch array 12 is comprised of 64 switches 20 arranged in an 8 ×8 matrix array of rows and columns. Separate row and column conductors couple, in parallel, all the switches 20 of tee respectively associated row and column. As an example, the closing of switch 20*a* selects, by electrically intercoupling, row conductor 16*a* and column conductor 18*e*.

Transformer array 14 is comprised of 12 transformers C10, C11, C12, C00, C01, C02, R03, R04, R05, R13, R14, R15 each having a single output winding and one or more input windings. The 12transformers are divided into groups of six transformers; a group R associated with the eight row conductors 16; and a group C associated with the eight column conductors 18. Each row conductor 16 and each column conductor 18 is coupled to three serially associated input windings, each of the serially associated input windings being associated with a separate associated transformer, of three of the six transformers of the associated group. Each transformer is assigned a digital (positional) weight, $2^n$, and a binary value, 0 or 1, as noted in Table A.

TABLE A

| GROUP R | | | GROUP C | | |
|---|---|---|---|---|---|
| XMER | Weight | Value | XMER | Weight | Value |
| R00 | $2^0$ | "0" | C03 | $2^3$ | "0" |
| R01 | $2^1$ | "0" | C04 | $2^4$ | "0" |
| R02 | $2^2$ | "0" | C05 | $2^5$ | "0" |
| R10 | $2^0$ | "1" | C13 | $2^3$ | "1" |
| R11 | $2^1$ | "1" | C14 | $2^4$ | "1" |
| R12 | $2^2$ | "1" | C15 | $2^5$ | "1" |

Operation of the single illustrated embodiment is best discussed with respect to the effects produced by the closing of a single switch 20, such as by the depressing of the single associated keyboard key. In the illustrated array of $2^{2n}$ switches 20 arranged in $2^n$ rows and $2^n$ columns, each of the $2^n$ row conductors 16 and each of the $2^n$ column conductors 18 is coupled to $2^{n11}$—1 serially coupled input windings of the 2 ($2^{n1}$ $^{1}$—1) transformers that are associated with the row or column conductors. Thus, the closing of one switch 20, through node 32 and the serially aligned capacitor C, resistor R and voltage source E on one end and the grounded terminal on the other end, causes a current signal to flow through the selected, or energized, one row-conductor, column-conductor combination inducing in the single output windings of the affected 2 ($2^{n11}$—1) transformers, signals that are assigned respective digital weights and binary values. These signals are, in turn, through suitable amplifying devices A coupled to respectively associated inputs of the flip-flop stages $2^0$, $2^1$ —$2^{2n11}$ of a holding register 30. These concurrently generated output signals are representative of the bits of the $2^{2n}$ bit word that is associated with the particular depressed key that closes the associated switch 20 of switch array 12.

As an example of the above, the closing of switch 20*a* energizes row conductor 16*a* and column conductor 16*e* through voltage source E. Row conductor 16*a* is coupled to the following serially coupled input windings of the associated transformers: R05–1, R04–2, R03–1: column conductor 18*e* is coupled to the following serially coupled input windings of the associated transformers: C12–1, C01–2, C00–1. Using the multibit word of the form $2^0$, $2^1$, —$2^{2n11}$ where bit $2^0$ is the lowest ordered bit and bit $2^{2n11}$ is the highest ordered bit, the multibit output word is 001000.

The multibit half-word byte associated with each row conductor 16 and each column conductor 18 is placed alongside the respectively associated conductor for ease in evaluating the multibit word that is associated with each switch 20 at the intersection of the associated row conductor, column conductor combination. Thus, it can be seen that the closing of switch 20*b* couples to register 20 the multibit word 101011 while the closing of switch 20*c* couples to register 30 the multibit word 010110.

Although the illustrated embodiment includes both 1 and 0 transformers, e.g., transformers C10 and C00, the 0 transformers C00, C01, C02, R03, R04, R05 may be dispensed with where no output 0 signal is required, such as where register 30 is initially set to all 0's with only 1 signals required to set the associated stages of register 30. However, this configuration does permit uneven loading of the row conductors 16 and the column conductors 18 whereby variations in the output signal inputs to the associated amplifiers A may be undesirable.

I claim:

1. Encoder apparatus, comprising:
a plurality of switching means arranged in rows and columns;
a plurality of row conductors, each parallel coupling only the switching means of an associated row;
a plurality of column conductors, each parallel coupling only the switching means of an associated column;
a plurality of row transformers, each having a single output winding and at least one input winding;
a plurality of column transformers, each having a single output winding and at least one input winding;
means separately coupling each of the row conductors to only one input winding of selected ones of said row transformers;
means separately coupling each of the column conductors to only one input winding of selected ones of said column transformers;
means for causing a current signal to flow through the selected row conductor, column conductor combination when one of said switching means is closed; and
said selected row-conductor, column-conductor combination inducing output signals in the output windings of the selected row transformers and column transformers, said output signals representative of a multibit word associated with the closed switching means.

2. Encoder apparatus, comprising:
$2^{2n}$ switching means arranged in $2^n$ rows and $2^n$ columns;
$2^n$ row conductors each parallel coupling only the switching means of an associated row;
$2^n$ column conductors each parallel coupling only the switching means of an associated column;
$n$ row transformers, each having a single output winding and $2^0, 2^1, \ldots 2^{n-1}$ input windings, respectively;
$n$ column transformers, each having a single output winding and $2^0, 2^1, \ldots 2^{n-1}$ input windings, respectively;
means separately serially coupling each of the $2^n$ row conductors to only one input winding of selected ones of said row transformers;
means separately coupling each of the $2^n$ column conductors to only one input winding of selected ones of said column transformers;
means for causing a current signal to flow through the selected row-conductor, column-conductor combination when one of said switching means is closed; and
said selected row-conductor, column-conductor combination inducing output signals in the output windings of the selected row transformers and column transformers, said output signals representative of a $2^n$ bit word associated with the closed switching means.

3. Encoder apparatus, comprising:
$2^{2n}$ switching means arranged in $2^n$ rows and $2^n$ columns;
$2^n$ row conductors, each parallel coupling only the switching means of an associated row;
$2^n$ column conductors, each parallel coupling only the switching means of an associated column;
$n$ 0 row transformers, each having a single output winding and $2^0, 2^1, \ldots 2^{n-1}$ input windings, respectively;
$n$ 1 row transformers, each having a single output winding and $2^0, 2^1, \ldots 2^{n-1}$ input windings, respectively;
$n$ 0 column transformers, each having a single output winding and $2^0, 2^1, \ldots 2^{n-1}$ input windings, respectively;
$n$ 1 column transformers, each having a single output winding and $2^0, 2^1, \ldots 2^{n-1}$ input windings, respectively;
means separately serially coupling each of the $2^n$ row conductors to only one input winding of $n$ alternative ones of said 0 or 1 row transformers;
means separately serially coupling each of the $2^n$ column conductors to only one input winding of $n$ alternative ones of said 0 or 1 column transformers;
means for causing a current signal to flow through the selected row-conductor, column-conductor combination when one of said switching means is closed; and
said selected row-conductor, column-conductor combination inducing output signals in the output windings of the selected row transformers and column transformers, said output signal representative of a $2^n$ bit word associated with the closed switching means.

UNITED STATES PATENT OFFICE
CERTIFICATE OF CORRECTION

Patent No. 3,573,807 Dated April 6, 1971

Inventor(s) George T. Osborne

It is certified that error appears in the above-identified patent and that said Letters Patent are hereby corrected as shown below:

Column 3, line 41, and Column 4, lines 16, 42 and 44, "row-conductor, column-conductor", each occurrence, should r -- row conductor, column conductor. Column 4, lines 4, 6, 28 30, 32 and 34, $2^{n11}$ should read $2^{n-1}$ Column 4, lines 27, 31, 37 and 40, "O", each occurrence, sho read -- "0" --; same column 4, lines 29, 33 and 40, "l", eac occurrence, should read -- "1" --.

Signed and sealed this 7th day of December 1971.

(SEAL)
Attest:

EDWARD M.FLETCHER,JR.
Attesting Officer

ROBERT GOTTSCHALK
Acting Commissioner of Pat

UNITED STATES PATENT OFFICE
CERTIFICATE OF CORRECTION

Patent No. 3,573,807 Dated April 6, 1971

Inventor(s) George T. Osborne

It is certified that error appears in the above-identified patent and that said Letters Patent are hereby corrected as shown below:

Colume 2, line 50, "$2^{nll}-1$" should be -- $2^{n-1}-1$ --.

Column 2, lines 50-51 and line 58, "$(2^{nll}-1)$" should be -- $(2^{n-1}-1)$ --.

Column 2, lines 61, 73 and 74, "$2^{2nll}$" should be -- $2^{2n-1}$ --.

Signed and sealed this 3rd day of December 1974.

(SEAL)
Attest:

McCOY M. GIBSON JR.
Attesting Officer

C. MARSHALL DANN
Commissioner of Patents